United States Patent

Ott et al.

[11] Patent Number: 6,121,575
[45] Date of Patent: Sep. 19, 2000

[54] METHOD AND APPARATUS FOR ARC WELDING

[75] Inventors: Brian L. Ott, Appleton; David G. Almy, Fremont; Jeffrey Ihde, Greenville, all of Wis.

[73] Assignee: Illinois Tool Works Inc., Glenview, Ill.

[21] Appl. No.: 09/160,488

[22] Filed: Sep. 25, 1998

[51] Int. Cl.$^7$ .................................................. B33K 9/095
[52] U.S. Cl. .................................. 219/130.5; 219/137.71
[58] Field of Search .......................... 219/130.5, 130.1, 219/130.21, 130.31, 130.32, 130.33, 130.51, 132, 137.71, 137 PS

[56] References Cited

U.S. PATENT DOCUMENTS

| | | | |
|---|---|---|---|
| 4,527,045 | 7/1985 | Nakajima et al. | 219/130.21 |
| 4,608,482 | 8/1986 | Cox et al. | 219/130.31 |
| 4,973,821 | 11/1990 | Martin | 219/130.51 |
| 5,063,282 | 11/1991 | Gilliland | 219/130.51 |
| 5,157,236 | 10/1992 | Batzler et al. | 219/130.51 |
| 5,683,602 | 11/1997 | Stava . | |

*Primary Examiner*—Clifford C. Shaw
*Attorney, Agent, or Firm*—George R. Corrigan

[57] ABSTRACT

A method and apparatus for welding include a source of power, a wire feeder and a controller. The controller sends control signals to the wire feeder and the source of power. The controller also has an adjustable arc control input, and the controller controls at least three welding parameters in response to the arc control input. The arc control input may be an arc width input, and the controller may simultaneously control at least three welding parameters to obtain a desired arc width. The at least three welding parameters may include at least three of peak welding current, background welding current, pulse width, and frequency and the arc control input may be a user-selectable input.

22 Claims, 1 Drawing Sheet

METHOD AND APPARATUS FOR ARC WELDING

FIELD OF THE INVENTION

This invention relates generally to the field of electric arc welding, and more particularly to the field of controlling welding parameters in electric arc welding.

BACKGROUND OF THE INVENTION

Electric arc welding is well known, and is performed with a variety of processes using a variety of types of equipment. One electric arc welding process is a pulse spray process, which is typically performed using a wirefeeder and a power supply. An example of a prior art power supply used in pulse spray welding is a Miller S64M™ wirefeeder. The Miller S64M™ wirefeeder may be used with a Miller XMT304™ power supply.

Typically, in pulse spray processes, power is provided from the power supply to the wirefeeder, and the wirefeeder provides the wire and power to the arc. The wirefeeder typically includes a controller, which may be part of or separate from the wirefeeder, and which controls the wire feed speed based on a user-selected input. Additionally, the controller provides a command signal to the power supply which causes the power supply to output a current and voltage at a desired magnitude. The command is produced in response to a user-selected wire feed speed. The power supply provides a specified current by adjusting the output voltage until the desired current is obtained. The current amplitude is often controlled as a function of time, switching between a background current and a peak current, thus creating a pulsed output.

The welding process is often controlled by controlling various welding parameters. For example, the pulse spray process is typically controlled by adjusting such welding parameters as A) peak amps, B) background amps, C) pulse width, and D) frequency. The parameters are typically adjusted using a controller which provides control signals to the wire feeder (or power supply). As used herein, welding parameters refer to parameters of the welding power output, such as peak amps, background amps, frequency, and pulse width.

Some wirefeeder controllers include factory programs which preset various welding parameters. The values for these parameters are stored by the controller (often in digital or other types of memory). Also, many controllers allow the user to store user-created programs which store user-selected welding parameters. In such a case, the user teaches or sets the desired values for welding parameters, and stores them in the memory.

When the user wishes to access either the factory preset or the user-created programs, they are individually selected using some type of digital interface. Then, the controller commands the power supply to provide power at the called for current, peak current, background current, frequency and pulse width, thus providing the desired welding parameters.

Different types of welding require different types of arc characteristics (such as the plasma cone angle\width and intensity, hereafter referred to as arc width). For example, flat, horizontal down, welding typically may be performed using a relatively wide arc. Conversely, overhead welding, or welding in other difficult or inconvenient physical positions, often requires a narrow arc.

The preset factory programs are typically set to provide for welding with a wide arc, since this is the one most inexperienced welders will use. To access the narrower arc the welder must adjust the welding parameters manually and individually until the desired arc is obtained. It may be necessary to decrease one parameter as another parameter is increased, so that arc characteristics such as arc length do not change. Power and/or deposition rate do not change in alternative embodiments.

However, many welders lack the experience to know how to properly adjust the various parameters, and in particular welders do not understand the interaction between adjusting various parameters For example, to decrease arc width, frequency is decreased. However, increasing frequency also increases arc length. Many welders do not know this, nor do they know how to adjust the other welding parameters to offset the effect of changing frequency on arc length.

Some prior art wirefeeders provide for automatic adjustment of two welding parameters. The Miller 60M™ wire feeder includes a trim setting that adjusts up to two parameters (frequency and/or peak amps). Other welding power supplies may also adjust two welding parameters with a single knob. However, these do not properly adjust the arc width to a desired value while maintaining one or more other arc characteristics constant by adjusting welding parameters.

Accordingly, it is desirable that a welding power supply and wirefeeder include a controller that allows the user to adjust the arc width using a single knob, such that multiple welding parameters are adjusted to obtain a desired arc width, while maintaining one or more other characteristics of the arc.

SUMMARY OF THE PRESENT INVENTION

According to a first aspect of the invention a welding power supply includes a source of power, a wirefeeder and a controller. The controller sends control signals to the wirefeeder and the source of power. The controller also has a single adjustable arc control input, and the controller controls at least three welding parameters in response to the arc control input.

According to a second aspect of the invention a welding power supply includes a source of power, a wirefeeder and a controller. The controller controls the power source and the wirefeeder. Also, the controller has an arc width input, and simultaneously controls at least three welding parameters to obtain a desired arc width.

According to a third aspect of the invention a method of arc welding includes providing power to a welding arc and providing wire to the arc. A single arc control input is received and at least three welding parameters are controlled in response to the arc control input.

According to a fourth aspect of the invention a method of arc welding includes providing power to a welding arc and providing wire to the arc. An arc width input is received and the arc width is controlled in response to the arc width input. One alternative includes simultaneously controlling at least three of peak welding current, background welding current, pulse width and pulse frequency to obtain the desired arc width.

The at least three welding parameters include at least three of peak welding current, background welding current, pulse width, and frequency, and they are controlled in response to the arc control input in various alternatives. The arc control input is a user-selectable input in another alternative.

The controller also controls wire feed speed in another alternative. The controller includes at least one preset program that includes welding parameter set points, and the controller adjusts the set values in response to the arc control input, in another alternative.

The source of power is a pulsed source in another embodiment.

Other principal features and advantages of the invention will become apparent to those skilled in the art upon review of the following drawings, the detailed description and the appended claims.

Figure 1:
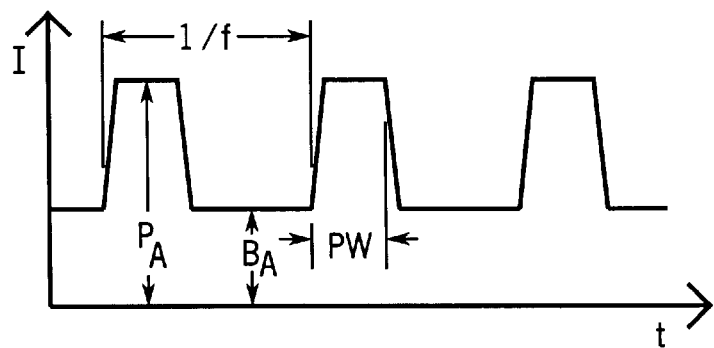
FIG. 1 is a waveform of a typical welding output for a pulsed arc welding process such as that used in the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular implementation and a particular flow chart for use with a particular power supply and wire feeder, it should be understood at the outset that the invention may also be employed with other flow charts, routines, values, limits, parameters, and equipment.

The invention generally includes adjusting welding parameters with a single knob (i.e. a single arc control input) that controls arc width (or a different arc characteristic) without adversely affecting other arc characteristics. For example, in the preferred embodiment a single digital knob (or other input device such as a digital input panel, keyboard, analog knob, sliding switch, etc) on the controller allows the user to select between an arc width adjustment of 0 and 20. An arc width adjustment of 0 is no arc width adjustment, and an arc width adjustment of 20 is the maximum arc width adjustment in the preferred embodiment. No adjustment is having the parameters be as they were in the original program, which is typically best for flat, horizontal down, welding (i.e., using a wide arc).

The preferred embodiment uses the Miller S64M™ wire feeder, and Miller XMT304™ power supply. The preferred wire feeder includes a digital controller, which includes an Intel 80C196™ microprocessor and a 1 Meg EPROM memory. The controller, as described above, sets welding parameters according to factory set, or user-set, programs. Alternative embodiments provide that the controller is part of the power supply, or in a separate housing. The controller also receives as an input the arc width adjustment knob setting in the preferred embodiment. This input is used to scale (i.e. change from the previous setting) the program welding parameter settings, as detailed below, to adjust the arc width from a minimum to a maximum. The knob setting is stored with the other weld parameter settings in any user-created programs in the preferred embodiment.

The arc width adjustment is made by adjusting three or four welding parameters simultaneously, such that one or more other characteristics of the arc are minimally affected. The inventors have determined various percentage adjustments of these parameters which they believe adequately satisfy these objectives given the equipment used in the preferred embodiment, but other adjustments may be made, and the invention is not limited to the specific adjustments detailed below.

Referring now to FIG. 1 a typical wave form of a pulse spray welding process is shown. The wave form includes a background amperage level $B_A$ and peak amperage level of $P_A$. Also shown by the wave form is a pulse width PW and a period 1/f or 1/frequency. The steepness of the transitions and flatness of the peak and background current may vary, and is dependent in part on the speed with which the power supply responds. Also, the range of obtainable frequencies is limited by the power supply, and is 60 Khz or less for the Miller XMT304™.

Four welding parameters, peak amps, background amps, pulse width and frequency are adjusted according to the preferred embodiment of the present invention (or at least three of the four are adjusted according to one alternative) such that when the user adjusts the arc width one or more other arc characteristics are not adversely affected.

For example, a decrease in arc width is obtained by decreasing frequency. If only the frequency is changed, the arc length will increase. The present invention also adjusts background amps and pulse width (and peak amps at higher wire feed speeds). These changes, if made alone, shorten the arc length. The magnitudes of the changes are selected to offset the increase in arc length caused by the frequency increase, resulting in a no, or little, net change in arc length.

Figure 2:
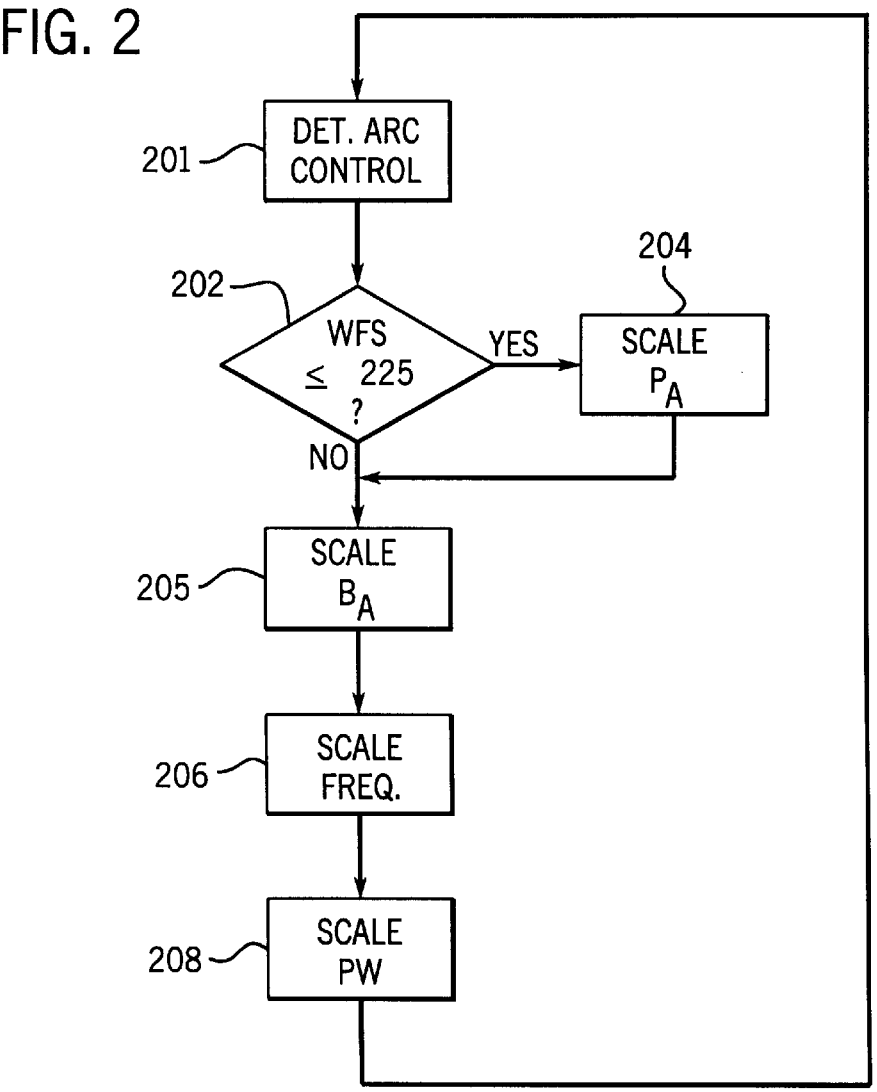
FIG. 2 is a flow chart of a program or a subroutine used to implement the preferred embodiment of the present invention.

FIG. 2 is a flow chart showing a routine which implements the preferred embodiment of the present invention. The flow chart is implemented with a computer routine in the controller for the wire feeder. The routine may be accessed on an ongoing basis, or when the welding process is initiated.

The user-selected arc control is determined in a box 201. This is the input used to scale the welding parameters to change the arc width, without adversely affecting one or more other arc characteristics. The preferred embodiment uses a scalar value of between 0 and 20, corresponding to the arc width knob setting, for the minimum and maximum adjustments to the arc width. The arc is widest with no adjustment (in the preferred embodiment).

The controller determines if the wirefeed speed is more than or less than 225 inches per minute in a box 202. Which parameters are scaled, as well as the amount of scaling, is dependent on whether the wire feed speed is more or less than a threshold of 225 IPM in the preferred embodiment. Other embodiments have the scaling vary with wire feed speed to a greater extent (more thresholds e.g.), or based on wire diameter.

If the wirefeed speed is more than 225 inches per minute the peak amperage is scaled in box 204. If the wirefeed is less than or equal to 225 amps the peak amps are not scaled.

The background amps, frequency, and pulse width are adjusted (for both over and under 225 inches per minute for wirefeed speed) in boxes 205, 206 and 208.

The actual code used to implement the invention will now be described. Of course, one skilled in the art will readily understand that other routines may be used to implement the invention. The first line of the computer code is ScaledArcWidth=((prog->ArcWidth*100)/ARC_

WIDTH_MAX);, where ScaledArcWidth is the variable for determining the scaling of the welding parameter, ArcWidth is the input from the control knob (and has a 1 to 20 value), and ARC_WIDTH_MAX is a scalar. This adjusts the user-selected arc control input to the appropriate scale for the rest of the routine.

The next statement is if(prog->ipm[WELD]<=225;, and is part of an "if/else" statement where the wire feed speed is determined. If the wire feed speed is less than or equal to 225 inches per minute the background amps, frequency, and pulse width are adjusted. If the wire feed speed is more than 225 inches per minute then the background amps, frequency, pulse width, and peak amps are adjusted.

Each of the parameters are set by a program (a factory program or user-defined program) implemented by the wire feeder microprocessor (or analog control circuitry in an alternative embodiment). The preferred embodiment adjusts those parameters as set forth below. The specific adjustments of the preferred embodiment were determined using empirical data, and may be different in different alternatives. Thus, the inventors have learned that a more narrow arc may be obtained with an increased frequency, a decreased background amps, and a decreased pulse width. proper adjustment of these parameters will also result in a relatively unchanged arc length. This is especially useful when welding in physically inconvenient positions.

If the wire feed speed is less than or equal to 225 IPM, then the next three lines of code are temp[BACK_A]-= (long) (((temp[BACK_A]*ScaledArcWidth*10)/10000));, followed by temp[FREQ]+=(long) (((temp[FREQ] *ScaledArcWidth*66)/10000));, and temp[PULSE_W]-= (long) (((temp[PULSE_W]*ScaledArcWidth*25)/10000)) ;. The background amps set point is adjusted in the first line, the frequency set point is adjusted in the second line, and the pulse width set point is adjusted in the third line.

The background amps set point is adjusted by 0 if the knob setting is zero, and downward 10% (of the prior set point) if the knob setting is 20, and proportionally between these settings. The frequency set point is adjusted by 0 if the knob setting is zero, and upward by 66% (of the prior set point) if the knob setting is 20, and proportionally between these settings. The pulse width set point is adjusted by 0 if the knob setting is zero, and downward by 25% (of the prior set point) if the knob setting is 20, and proportionally between these settings.

If the wire feed speed is more than 225 IPM, then the next four lines of code (the "else" part of the "if/else" statement) are temp[BACK_A]-=(long) (((temp[BACK_A] *ScaledArcWidth*40)/10000));, followed by temp [FREQ]+=(long) (((temp[FREQ]*ScaledArcWidth*97),/ 10000));, and followed by temp[PULSE_W]-=(long) (((temp[PULSE_W]*ScaledArcWidth*33) /10000)); and finally followed by temp[PEAK_A]-=(long) (((temp [PEAK_A]*ScaledArcWidth*2) /10000));. The background amps set point is adjusted in the first line, the frequency set point is adjusted in the second line, the pulse width set point is adjusted in the third line, and the peak amps set point is adjusted in the fourth line.

The background amps set point is adjusted by 0 if the knob setting is zero, and downward 40% (of the prior set point) if the knob setting is 20, and proportionally between these settings. The frequency set point is adjusted by 0 if the knob setting is zero, and upward by 97% (of the prior set point) if the knob setting is 20, and proportionally between these settings. The pulse width set point is adjusted by 0 if the knob setting is zero, and downward by 33% (of the prior set point) if the knob setting is 20, and proportionally between these settings. The peak amps set point is adjusted by 0 if the knob setting is zero, and downward by 2% (of the prior set point) if the knob setting is 20, and proportionally between these settings. Adjusting the peak amps at higher wire feed speeds preferably helps to maintain a constant arc length if the arc width is changed.

A final line of code is if (temp[PULSE_W]< (11*COUNT_CONVERT)), then temp[PULSE_W]= (10*COUNT_CONVERT);, and provides an error check to make sure the pulse width is not too narrow.

One alternative includes a knob or input that controls an arc characteristic other than arc width, and the controller adjusts three of more welding parameters to change that characteristic, while avoiding an adverse change to one or more remaining characteristics (such as arc width).

Another alternative includes having the adjustment of each welding parameter be a function of both the knob setting and the wirefeed speed. In other words, the line of codes that adjust the parameters would include a scaled variable based on wire feed speed. Another alternative is always adjusting only three welding parameters, and different sets of three parameters in different alternatives.

Numerous modifications may be made to the present invention which still fall within the intended scope hereof. Thus, it should be apparent that there has been provided in accordance with the present invention a method and apparatus for controlling a welding process that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding power supply comprising:
   a source of power, having at least one power source control input;
   a wire feeder, connected to the source of power and having at least one wire feeder control input;
   a controller, having a plurality of control outputs connected to the power source control input and the wire feeder control input; and
   a single, user-selectable, adjustable arc characteristic control input connected to the controller, wherein at least three welding parameters are controlled in response to the arc control input, wherein at least one arc characteristic is controlled in response to the user-selectable adjustable arc characteristic control input.

2. The welding power supply of claim 1 wherein the at least three welding parameters include at least three of peak welding current, background welding current, pulse width, and frequency.

3. The welding power supply of claim 2, wherein the controller includes at least one program to control welding parameters to be set values, and further wherein the controller adjusts the set values in response to the arc control input.

4. The welding power supply of claim 1 wherein the controller includes a wirefeed speed output that is connected to the wire feeder control input.

5. The welding power supply of claim 1, wherein the source of power is a pulsed power source.

6. The welding power supply of claim 5, wherein the at least three welding parameters include at least three of peak welding current, background welding current, pulse width and pulse frequency.

7. The welding power supply of claim 6, wherein at least three welding parameters are controlled in response to the arc control input.

8. A welding power supply comprising:
   a source of power, having at least one power source control input;
   a wire feeder, connected to the source of power and having at least one wire feeder control input; and
   a controller having welding parameter outputs connected to the power source control input and the wire feeder control input, and further including an arc width input, wherein at least three welding parameters are simultaneously controlled in response to the arc width input such that a desired arc width is obtained.

9. The welding supply of claim 8 wherein the at least three welding parameters include at least three of peak welding current, background welding current, pulse width and pulse frequency.

10. A welding power supply comprising:
    power source means for providing welding power, the power source means having at least one power source control input;
    wire feeder means for providing wire to an arc, the wire feeder means being connected to the power source means and having at least one wire feeder control input;
    controller means for controlling the power source means and the wire feeder means, the controller means having a plurality of control outputs connected to the power source control input and the wire feeder control input; and
    a single adjustable arc characteristic control means for providing an input indicative of a desired arc characteristic, the arc control means being connected to the controller means, wherein the controller means includes means for controlling at least three welding parameters in response to the arc characteristic control input.

11. The welding power supply of claim 10, wherein the at least three welding parameters include at least three of peak welding current, background welding current, pulse width, and frequency.

12. The welding power supply of claim 11, wherein the controller means includes digital means for storing at least one program to control welding parameters to be set values, and further wherein the controller means includes means for adjusting the set values in response to the arc characteristic control input means.

13. A welding power supply comprising:
    power source means for providing welding power, the power source means having at least one power source control input;
    wire feeder means for providing wire to an arc, the wire feeder means being connected to the power source means and having at least one wire feeder control input;
    controller means for controlling the power source means and the wire feeder means, the controller means having a plurality of control outputs connected to the power source control input and the wire feeder control input;
    an arc width input means for providing an arc width input, the arc width means being connected to the controller means; and
    wherein the controller means includes means for controlling the arc width in response to the arc width input means.

14. The welding supply of claim 13 wherein the controller means includes means for controlling at least three of peak welding current, background welding current, pulse width and pulse frequency in response to the arc width input means.

15. A method of arc welding comprising:
    providing power to a welding arc;
    providing wire to the arc;
    receiving a single user selected arc characteristic control input;
    controlling at least three welding parameters in response to the single arc characteristic control input.

16. The method of claim 15 wherein the step of controlling includes controlling at least three of peak welding current, background welding current, pulse width, and frequency.

17. The method of claim 16, further including the step of storing at least one program to control welding parameters to be set values, and further including the step of adjusting the set values in response to the single arc control input.

18. The method of claim 15 further including the step of controlling a wirefeed speed.

19. The method of claim 15, wherein the step of providing power includes the step of providing pulsed power.

20. The method of claim 19, wherein the step of controlling includes controlling at least three of peak welding current, background welding current, pulse width and pulse frequency.

21. A method of providing welding power comprising:
    providing power to a welding arc;
    providing wire to the arc;
    receiving an arc width control input;
    controlling the arc width in response to the arc control input.

22. The method of claim 21 wherein the step of controlling includes controlling at least three of peak welding current, background welding current, pulse width and pulse frequency.

* * * * *